US011141029B1

(12) United States Patent
Janicki et al.

(10) Patent No.: US 11,141,029 B1
(45) Date of Patent: Oct. 12, 2021

(54) WASTE PROCESSING TOILET FOR USE IN LOCATIONS HAVING LIMITED UTILITY SERVICE

(71) Applicant: Sedron Technologies, LLC, Sedro-Woolley, WA (US)

(72) Inventors: Peter Janicki, Mount Vernon, WA (US); Sara VanTassel, Sedro-Woolley, WA (US); Margaret Fujihara, Mission Viejo, CA (US); Alexsander Voron, Vancouver (CA); Jonathan Holt, Bellingham, WA (US); Adam Good, Mill Creek, WA (US); Karl Ellingson, Bellingham, WA (US)

(73) Assignee: Sedron Technologies, LLC, Sedro-Wooley, WA (US)

( * ) Notice: Subject to any disclaimer, the term of this patent is extended or adjusted under 35 U.S.C. 154(b) by 155 days.

(21) Appl. No.: 16/681,688

(22) Filed: Nov. 12, 2019

Related U.S. Application Data

(60) Provisional application No. 62/758,481, filed on Nov. 9, 2018.

(51) Int. Cl.
| | |
|---|---|
| *A47K 11/02* | (2006.01) |
| *C02F 11/13* | (2019.01) |
| *F23G 5/04* | (2006.01) |
| *C02F 103/00* | (2006.01) |

(52) U.S. Cl.
CPC ............ *A47K 11/023* (2013.01); *C02F 11/13* (2019.01); *F23G 5/04* (2013.01); *C02F 2103/005* (2013.01)

(58) Field of Classification Search
CPC ........ A47K 11/023; C02F 11/13; C02F 11/12; C02F 2103/005; F23G 5/04
See application file for complete search history.

(56) References Cited

U.S. PATENT DOCUMENTS

| | | | | |
|---|---|---|---|---|
| 2,032,402 | A * | 3/1936 | Colby ..................... | C02F 11/13 110/220 |
| 4,213,407 | A * | 7/1980 | Headley ................ | F26B 3/0923 110/346 |
| 2006/0091083 | A1* | 5/2006 | Lumbert ................... | C02F 1/78 210/760 |
| 2016/0138433 | A1* | 5/2016 | Janicki .................... | C02F 1/004 60/671 |

* cited by examiner

*Primary Examiner* — Liam Royce
(74) *Attorney, Agent, or Firm* — Karr Tuttle Campbell; Paul Heynssens

(57) ABSTRACT

A waste burning toilet may operate on power generated from burning waste deposited in the toilet without connection to external electricity, a sewer, or water supply. A dryer connected to the toiled dries the waste prior to burning. The waste may be burnt in a firebox that is connected to the dryer. Heat from the firebox may be used to generate electricity that can power the components of the toilet system. The waste may be reduced to sterile ash.

7 Claims, 21 Drawing Sheets

Dryer and De-Gas Assembly 458

Exemplary Computing Environment 2000

US 11,141,029 B1

WASTE PROCESSING TOILET FOR USE IN LOCATIONS HAVING LIMITED UTILITY SERVICE

CROSS-REFERENCE TO RELATED APPLICATION

This application claims the benefit of U.S. Provisional Patent Application No. 62/758,481 filed Nov. 11, 2018, the contents of which are hereby incorporated by reference.

TECHNICAL FIELD

This description relates generally to toilets and more specifically to toilets suitable for use in areas having limited public utility service and sewer connections.

BACKGROUND

Human feces and household waste are viewed as unwanted byproducts of life. Sanitation is a global crisis. Hundreds of thousands of children die annually from illnesses that could have been avoided with better sanitation. One billion people openly defecate. Human waste that goes untreated is not the exception, but the global norm. The current state of global sanitation has significant room for improvement. Systems and techniques that process human waste in a way that reduces risk of illness and generates valuable byproducts will help address these issues.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system for processing human waste that may include a toilet configured to receive human waste, a dryer configured to dry human waste received to below a threshold moisture level creating dried human waste, and a firebox configured to receive the dried human waste from the dryer and burn the dried human waste to generate heat. In some cases, this heat may be used to generate electricity.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe toilet, dryer, and combustion systems for processing human waste. Although the present examples are described and illustrated herein as being implemented to operate "off the grid" without connection to utility-provided power, sewer, and/or water system, the system described is provided as an example and not a limitation. As those skilled in the art will appreciate, the present examples are suitable for application in a variety of different types of waste disposal systems.

Figure 1:
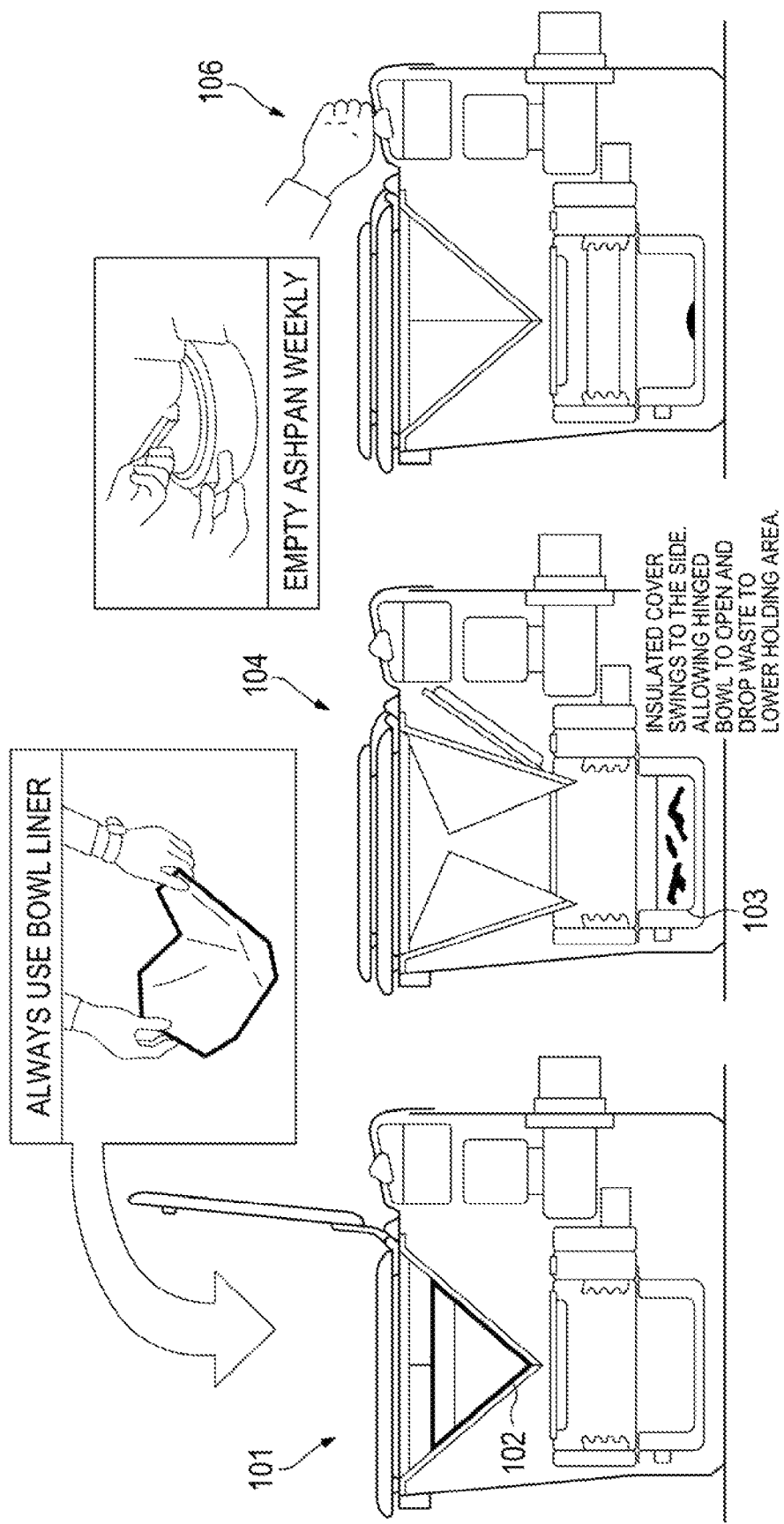
FIG. 1 shows a conventional incinerating toilet.

FIG. 1 shows a conventional incinerating toilet. In such a typical arrangement initially 101 a paper liner 102 may be installed in the incinerating toilet used to catch the waste. Next 104 the waste and liner are dropped into a combustion chamber 103, typically by pressing a foot pedal. Finally 106, the waste in the combustion chamber is incinerated-typically by pressing a button or the like 106.

Figure 2:
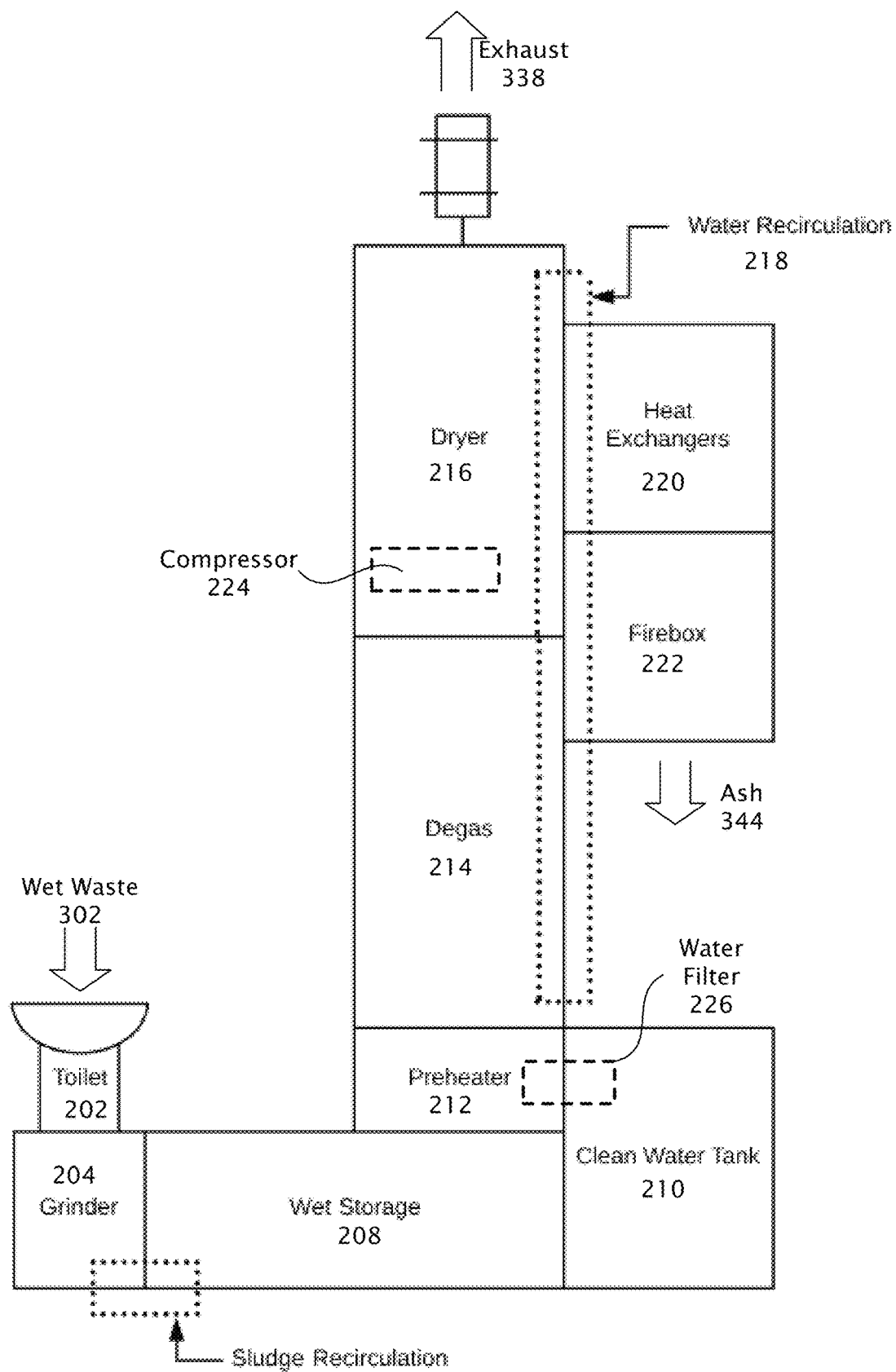
FIG. 2 is a pictorial diagram showing a toilet for use in locations having limited utility services.

FIG. 2 is a pictorial diagram showing the waste processing toilet for use in locations having limited utility services. Wet waste 302 enters a toilet 202, where it is flushed into a grinder 204. The waste from the grinder is transferred to a wet storage tank 208, equipped with a sludge recirculation pump 206.

A clean water tank 210 provides flush water for the toilet, and operation of the waste processing. The waste from the wet storage 201 enters a preheater 212, and is next degassed 214, after degassing, the waste is dried in a dryer 216, operating in cooperation with a compressor 224. The substantially dried waste enters a firebox 222 where it is burned yielding ash 344, and heat utilized by heat exchangers 220. The operation of the device 200 makes use of water recirculation 218 and a water filter 226 to filter the water recovered in the process. Exhaust 338 from the heat exchangers exits the unit. Unless otherwise described herein, the above mentioned components may be conventionally constructed as known to those skilled in the art.

Figure 3:
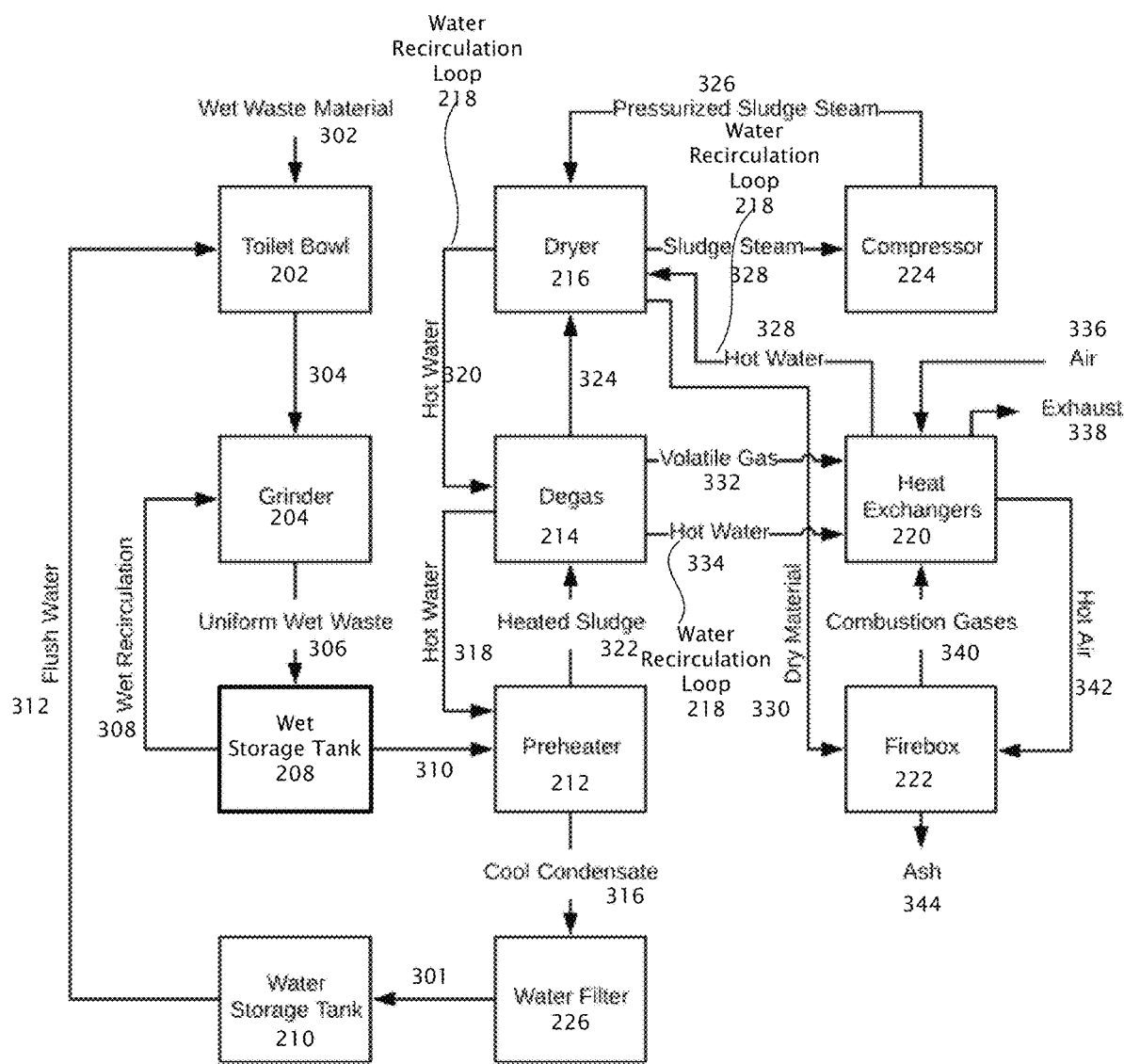
FIG. 3 is a system block diagram showing the toilet for use in locations having limited utility services.

FIG. 3 is a system block diagram of the waste processing toilet for use in locations having limited utility services 200. Waste material, including fecal mater, urine ("black water"), or also grey water, trash and the like 302 is deposited in a toilet bowl, (or equivalent receptacle) 202, that may be flushed 304 by flush water 312 into a grinder 204. The grinder produces uniform wet waste 306 that is routed into a wet storage tank 208 that is fitted with wet recirculation 308 that may include a pump (not shown).

Waste from the wet storage tank 208 is routed 310 into a preheater 212, to produce heated sludge 322 that is routed into a degassing apparatus 214. The output of the degasser 324 is routed into a dryer 216.

Water recirculation 218 is provided in that hot water 320 from the dryer is routed into the degas 214. And hot water 334 from the degas is routed into the heat exchangers 220 before feeding back into the dryer 216.

Dry material 330 from the dryer 216 is routed into a firebox 222, where it is burned producing ash 344 and combustion gases 340. The heat exchangers 220 utilize the combustion gases 340 to transfer heat to volatile gas 332 from the degas system 214 mixed with air 336, and hot water 334 also from the degas 214. The heat exchangers 220 produce hot air 342 that is routed into the firebox 222, and waste exhaust gas 338. Hot water 328 is also produced that is routed into the dryer 216.

The dryer 216 outputs sludge steam 328 to a compressor 244, that produces pressurized steam sludge 326 that is routed back into the dryer 216. When proper temperature conditions, as is known to those skilled in the art, are maintained in the dryer pasteurization of the waste material may also be performed in the dryer. The preheater 212 also produces a cold condensate 316 that is filtered 226 and stored in the water storage tank 210.

Toilet bowl 202 includes a waste material input 302, and an output flow 304 coupled to grinder 204. Flush water 312 is coupled from water storage tank to the toilet bowl 202.

Grinder 204 outputs uniform wet waste 306 to the wet storage tank 208. The grinder 204 receives wet recirculation 308 from the wet storage tank 208. In alternative examples wet recirculation may be omitted if the first pass of waste material is ground sufficiently.

Wet storage tank 208 provides an output 301 of ground waste material to the preheater 212. Prior to incineration of the waste material it will next be preheated, degassed and then dried.

At the preheater 212 the ground waste input 310 is preheated by conventionally constructed preheating equipment. The preheater outputs cold condensate 316 to the water filter 226. Heated sludge 322 is output to a degasser 214, that tends to prevent foaming in other components.

In the degasser 214 the degassed sludge is passed to the dryer 324. As a part of the water recirculation loop 218 the degasser also circulates hot water from the degasser to the preheater 212.

At the dryer 216 dried material 330 is output to the firebox 222. As part of the drying process sludge steam 328 is collected and compressed by a compressor 224. As part of the water recirculation loop 218 hot water 328 from the heat exchanger 220 is routed to the dryer 216. Also, hot water 320 is routed from the dryer 216 to the degasser 214.

Compressor 224 outputs pressurized sludge steam 326 to the dryer 216. The compressor 224 is conventionally constructed.

The firebox 222 outputs ash 344 and combustion gases 340. Hot air 342 from the heat exchangers 220 is routed to the firebox 222.

Heat exchangers 220 intake air 336, and produce an exhaust 338. Volatile gas 332 and hot water 334 from the degasser 214 are routed to the heat exchanger 220.

Water filter 226 is conventionally constructed. Filtered water 301 is output to the water storage tank 210.

Figure 4:
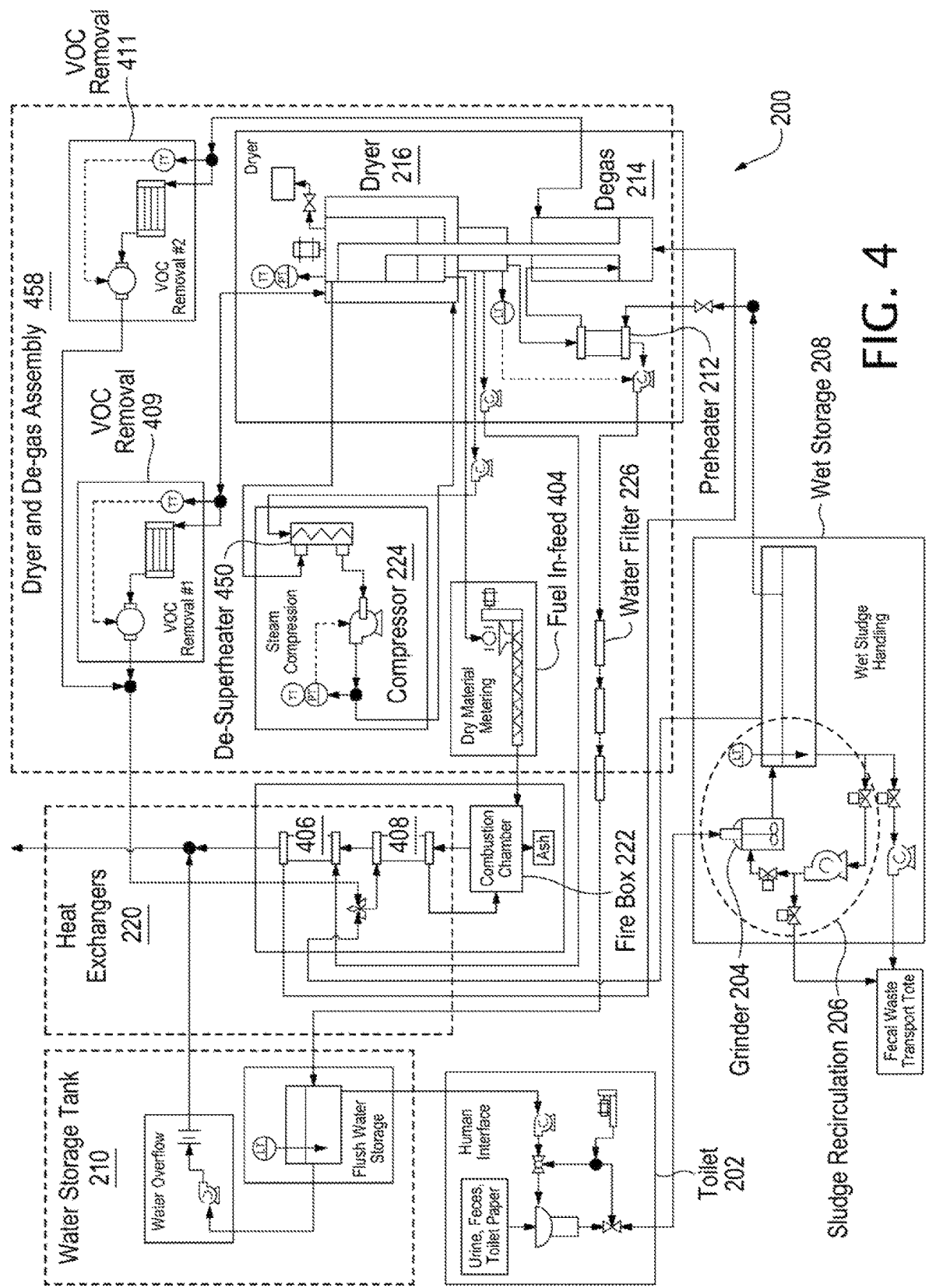
FIG. 4 is a system block diagram showing further detail of the block diagram in FIG. 3.

FIG. 4 is a system block diagram showing further detail of the block diagram in FIG. 3. In particular, the two heat exchangers 406, 408 that make up the heat exchangers (220 of FIG. 2) are shown. Also shown is the fuel infeed system 404 that feeds dried waste into the firebox 222.

In the dryer and de-gas assembly block 458 the details of the de-superheater 450, is shown, as well as volatile organic compounds (VOC) removal devices 409, 411.

Figure 5:
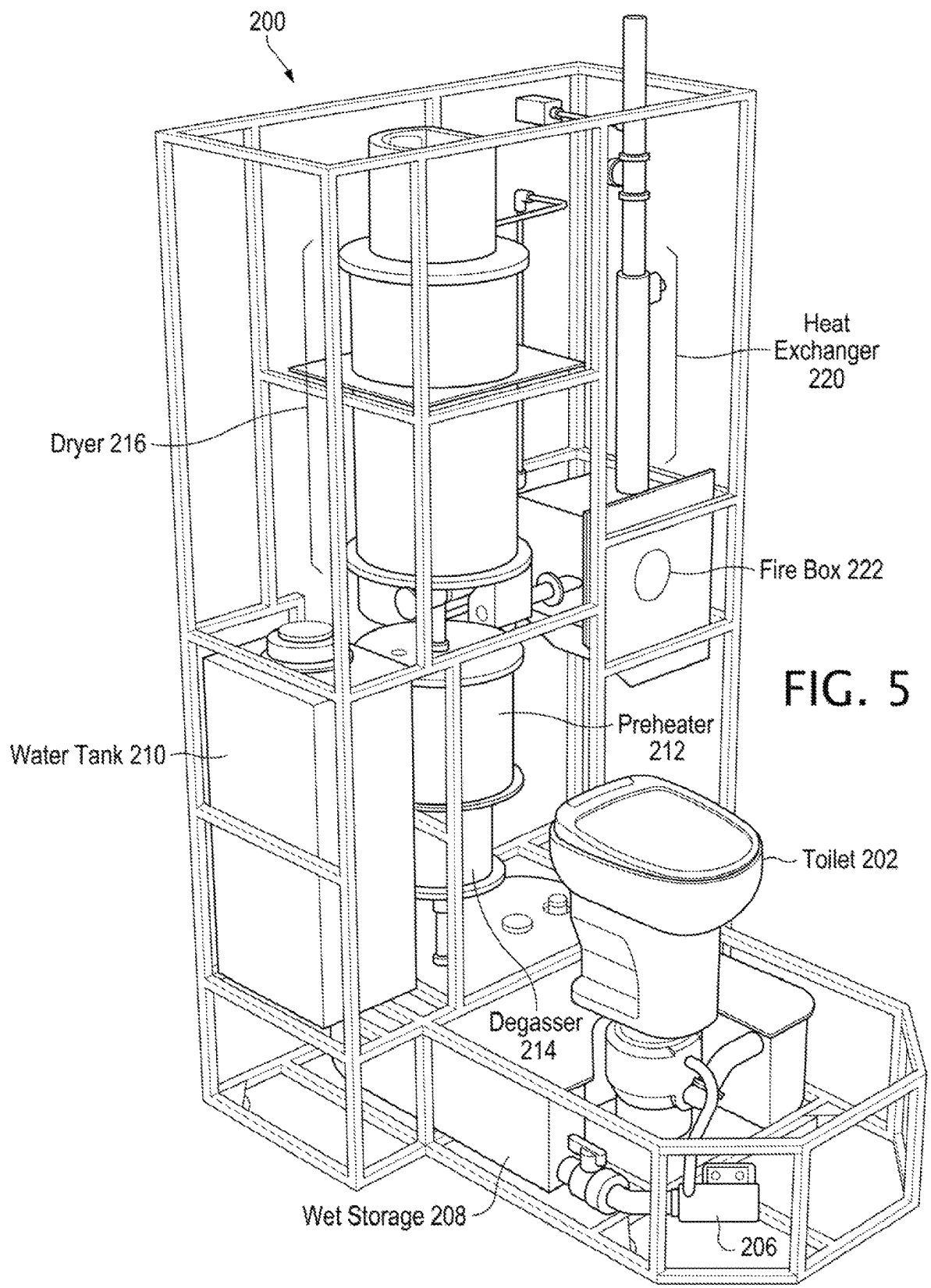
FIG. 5 shows an internal view of the toilet for use in locations having limited utility services.

FIG. 5 shows an internal view of the waste processing toilet for use in locations having limited utility services 200 so that the internal components may be viewed. The toilet 200 may be assembled onto a supporting frame as shown, or equivalently with a frame by the components being designed to support each other when assembled. A toilet 202 receives human waste or the like. The toilet may be flushed by water that is available from a water storage tank 208. The water in the water storage tank 208 need not be potable, but of only of acceptable cleanliness for use in flushing and filling the toilet bowl. A grinder 204 may be coupled to the toilet 202 to receive waste. The contents of the grinder 204 may be moved to a wet storage tank 208. Waste material enters the preheater 212, which is coupled to the degasser 214 which is in turn coupled to the dryer 216. A heat exchanger 220 is coupled to and works in conjunction with a firebox 222, and water recirculation 218.

The toilet 202 shown is a conventional recreational ("RV") style toilet. In equivalent examples other types of toilets may be used. Other waste (e.g., food waste, household waste, etc.) may also be deposited in the toilet 102 or in an optional waste port (not shown).

The grinder 204 may be a commercially available garbage disposal or an item of equivalent construction. The grinder may provide initial mechanical processing of the waste by reducing the size of large pieces and making the waste a more uniform consistency to aid in further processing.

Sludge recirculation may be provided by a conventionally constructed pump 206.

The wet storage tank 208 is an enclosed tank that receives the ground-up contents from the toilet. The wet storage tank may be vented to relieve pressure build up from gasses generated by waste in the tank. The wet storage tank may be made of metal, fiberglass, plastic or the like.

The water tank 210 is an enclosed tank that receives the water for use in flushing the toilet, or to be supplied as an output. The clean water tank may be made of metal, fiberglass, plastic or the like.

The preheater 212, degasser 214, dryer 216, water circulation 218, heat exchanger 220, and firebox 222 are constructed as described and shown herein.

Figure 6:
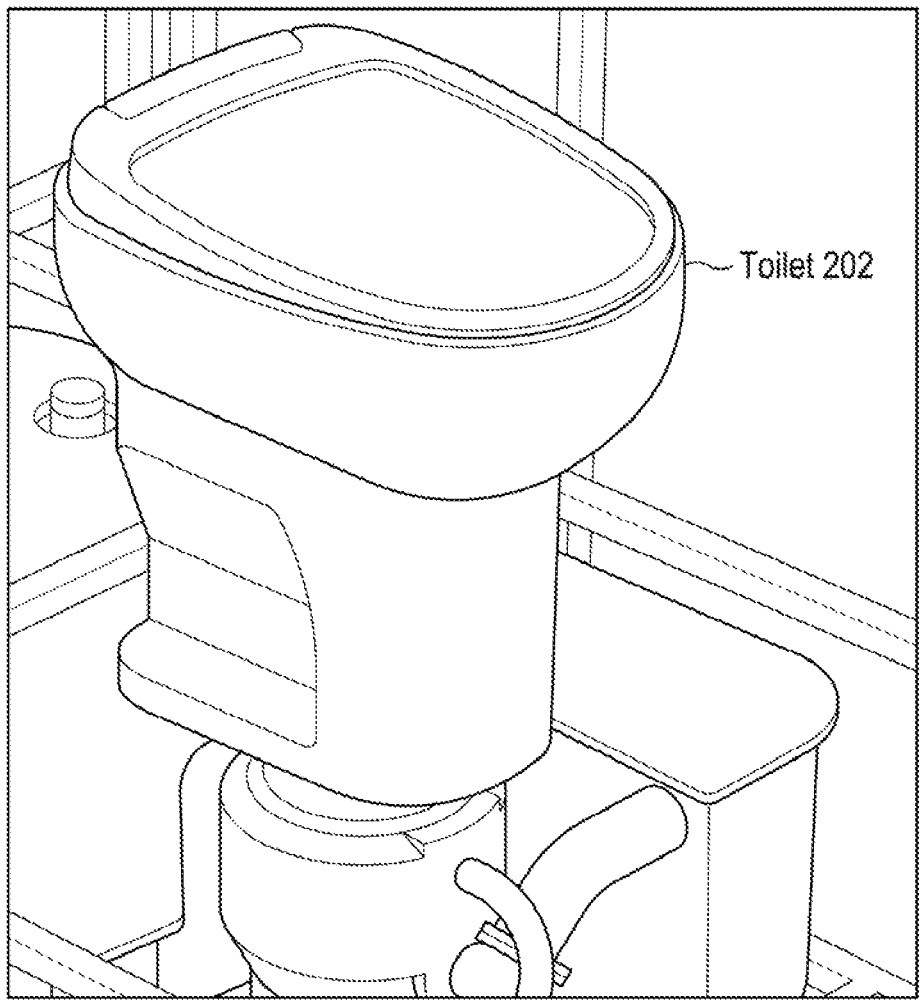
FIG. 6 is a pictorial diagram showing the RV toilet used in the toilet for use in locations having limited utility services.

FIG. 6 is a pictorial diagram showing the RV toilet used in the toilet for use in locations having limited utility services. The toilet 202 shown is a conventional recreational ("RV") style toilet. In equivalent examples other types of toilets, chutes or the like may be used.

Figure 7:
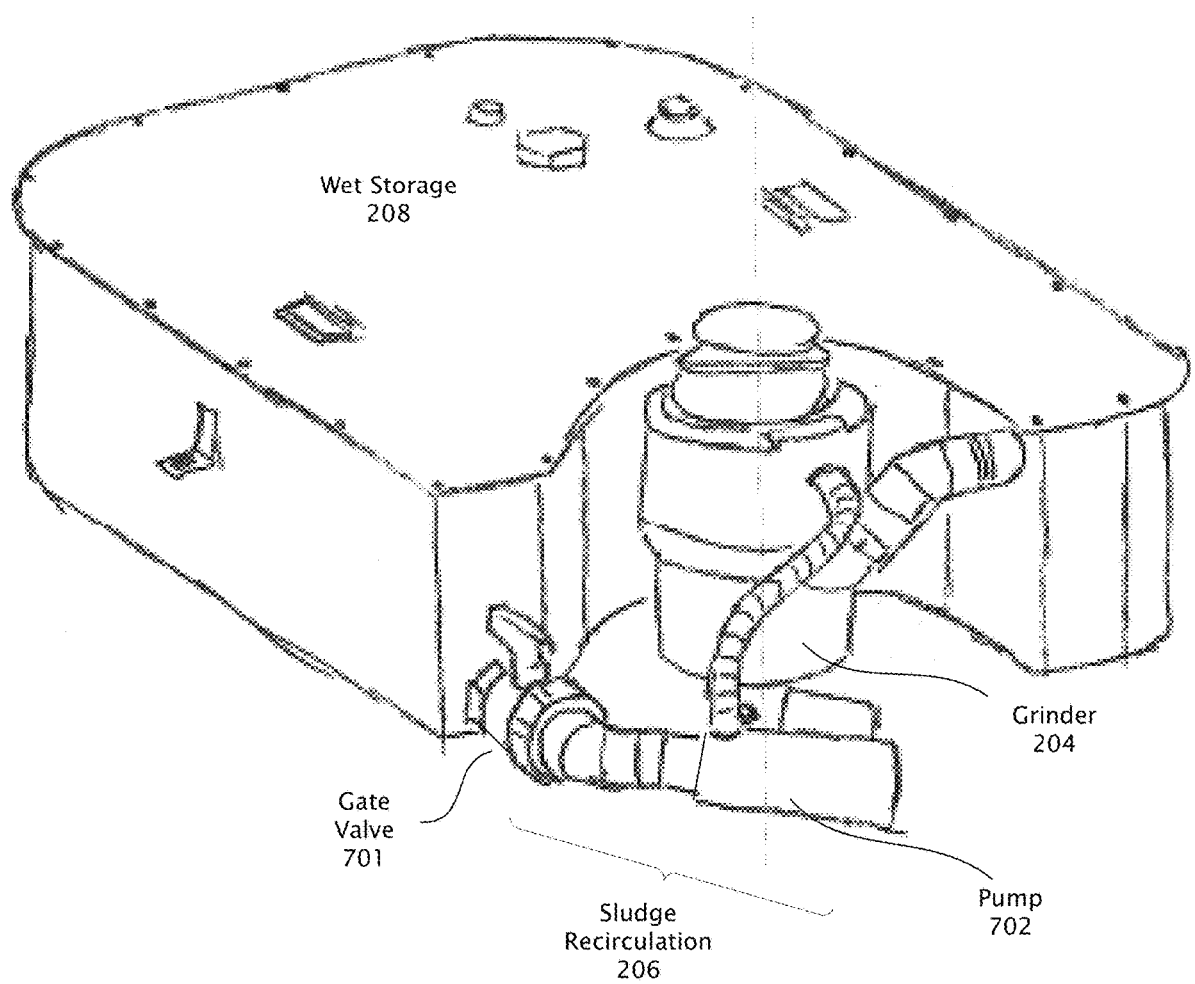
FIG. 7 is a pictorial diagram showing the grinder, wet storage tank and recirculation pump.

FIG. 7 is a pictorial diagram showing the grinder, wet storage tank and recirculation pump. As can be seen the grinder 204 may be a conventionally constructed kitchen disposal unit or its equivalent. The output of the grinder is directed to the wet storage 208. Sludge recirculation 206 input to grinder 204 is typically controlled via a pump 702. A gate valve 701 separates the wet storage 208 and the sludge recirculation 206 for maintenance purposes.

Figure 8:
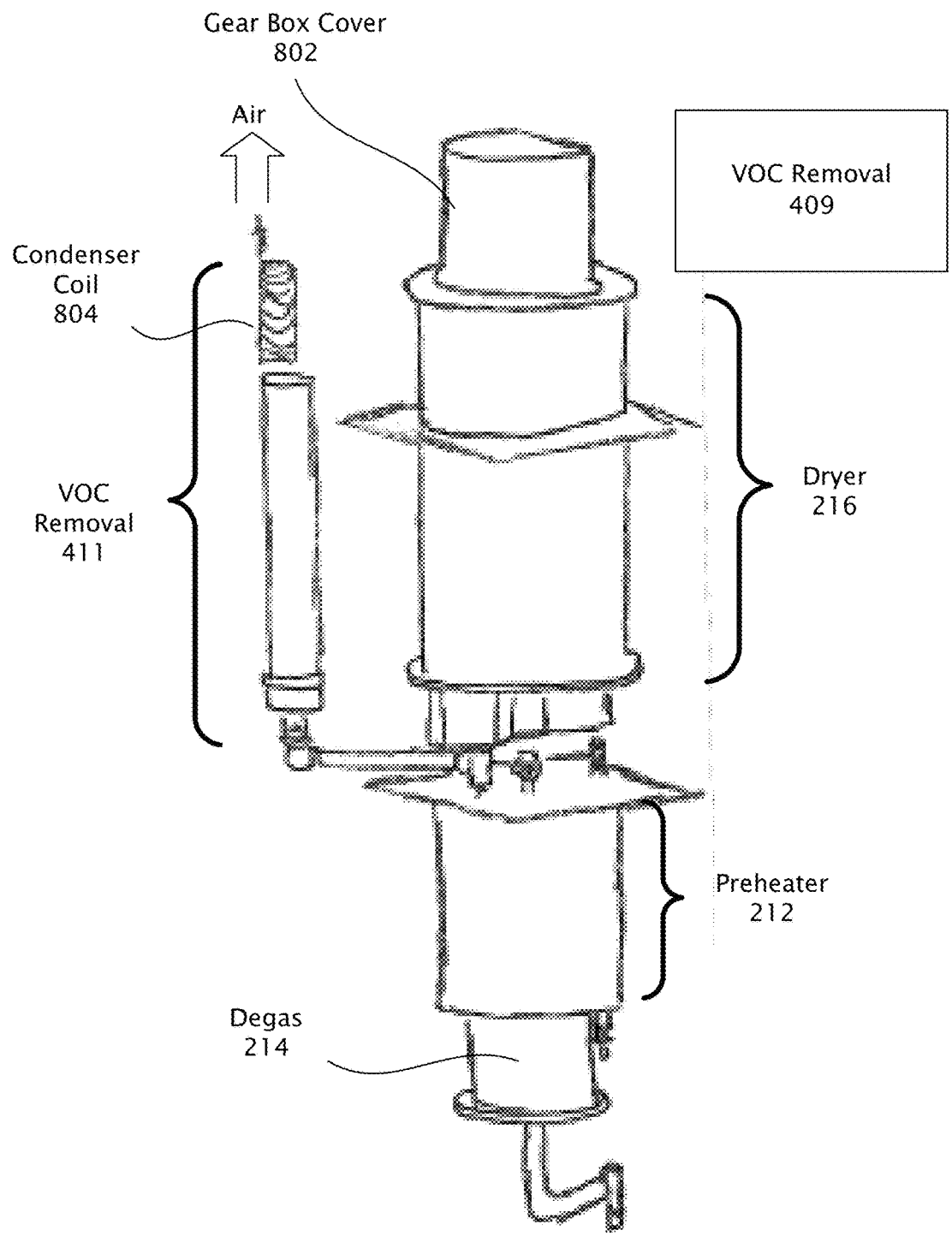
FIG. 8 is a pictorial diagram showing the preheater, degas and dryer components.

FIG. 8 is a pictorial diagram showing the preheater 212, degas 214 and dryer 216 components. The dryer and degas assemblies 458 have a compact construction. The degas unit 214 may extend coaxially into a preheater 212. The degas 214 unit routes its output into the dryer 216. Sludge is applied to the interior of the dryer using a combined applicator and scraper mechanism (1008 of FIG. 10, or FIG. 21). During the process of drying the sludge the dryer transfers heat the applied sludge to separate the liquid and solid fractions. The solid fractions are scraped from the interior of the dryer using the same mechanism as previously described. This mechanism includes a mechanical drive housed within the gear box cover 802. Also shown associated with this assembly 458 are two VOC removal devices 411, 409 that are conventionally constructed and function as previously described. VOC removal device 411 also includes a condenser coil 804.

Figure 9:
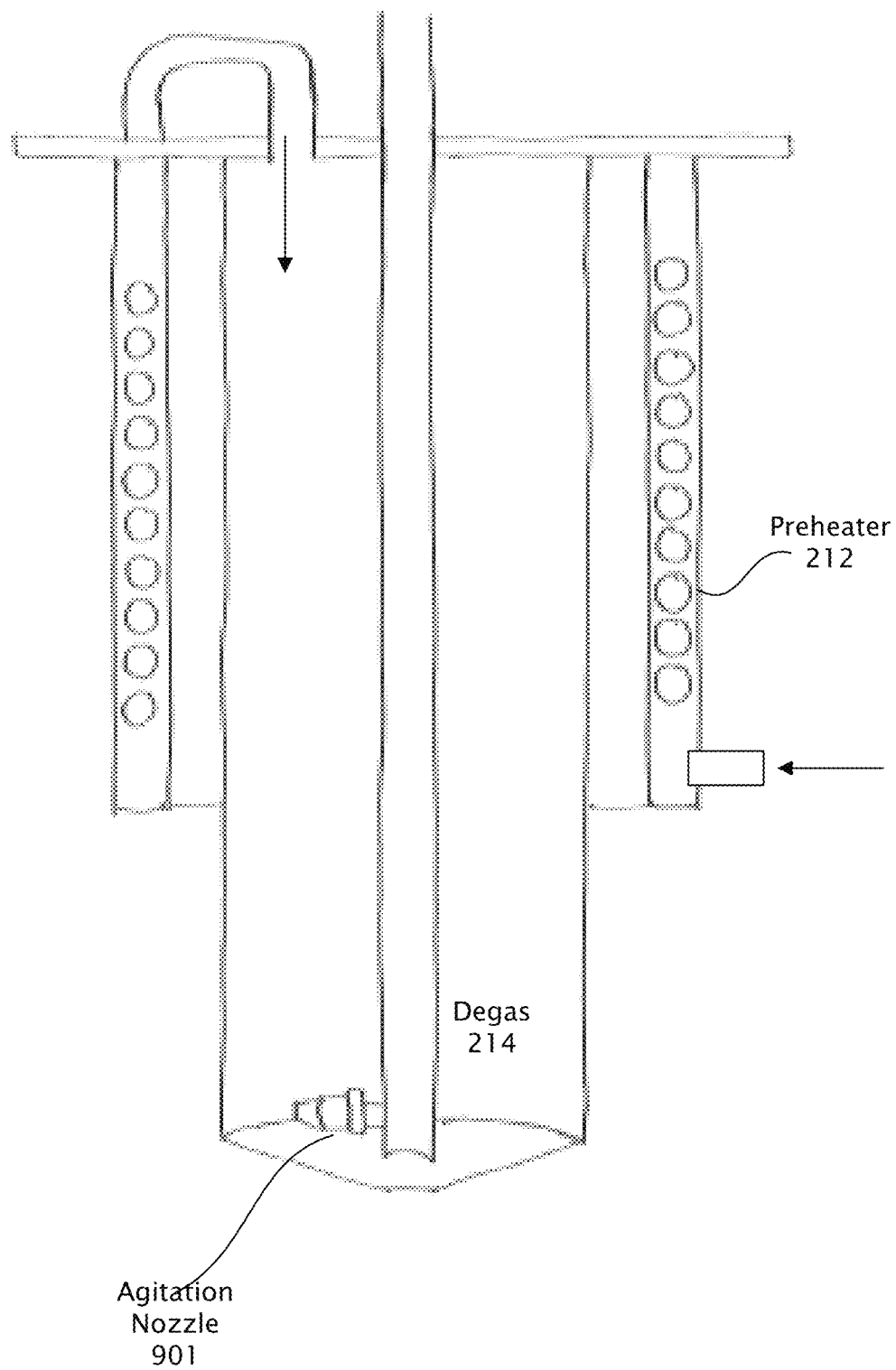
FIG. 9 is a pictorial diagram showing a cross section of the preheater, and degas components.

FIG. 9 is a pictorial diagram showing a cross section of the preheater 212, and degas 214 components. As previously described the degas component 214 may fit coaxially into the preheater 212. Waste enters the preheater 212 sludge coil from the bottom and exits the top at an acceptable temperature for degassing. Hot water from the dryer 320 flows counter to the waste and transfers heat to the waste. Those skilled in the art will recognize that there are many ways to implement the preheater. Waste from the preheater enters the degas 214 at its top. An agitator nozzle 901 may be used to aid in the removal of VOCs from the waste held in the degassing chamber.

Figure 10:
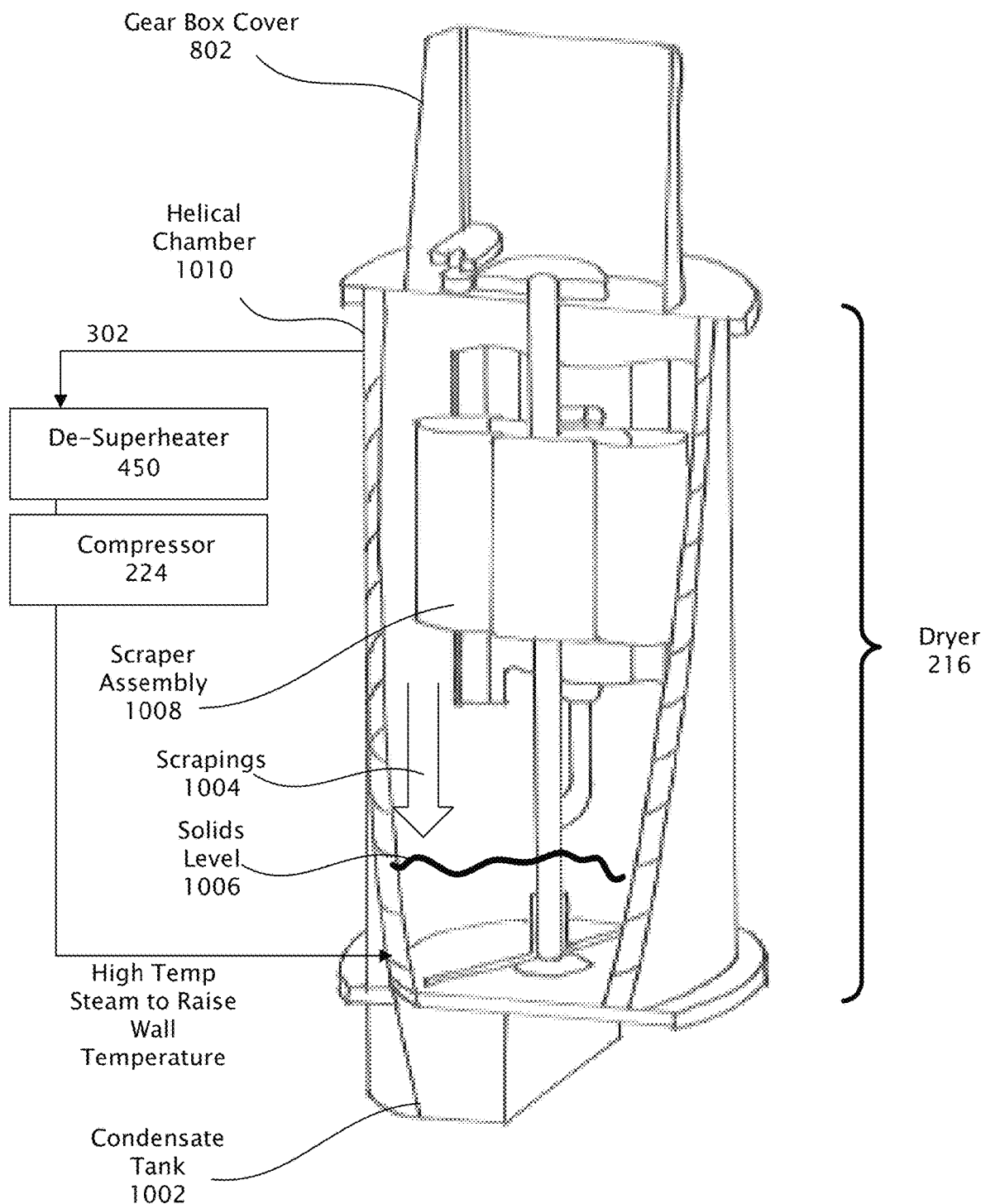
FIG. 10 is a pictorial diagram showing the combined dryer and fuel storage bin.

FIG. 10 is a pictorial diagram showing the combined dryer and fuel storage bin. A scraper mechanism 1008 applies degassed waste to the interior of the dryer 216 as it turns. The scraper also removes dried solids from the interior in the form of scrapings 1004 that are stored to a certain level 1006 in the dryer 216. Those skilled in the art will recognize that this scraper and applicator combination could be designed in many ways.

The solid and liquid fractions of the waste 302 are separated through thermal evaporation in the dryer 216. Water in the waste 302 is turned to vapor. The vapor is directed to a de-superheater 450 and then a compressor 224 where it undergoes mechanical recompression. The compressed vapor then returns to the dryer 216 through what can be a helical chamber 1010 where it is used as the heat source for the evaporation. In transferring its heat, the vapor condenses and forms a water output 320 that flows to the condensate tank 1002. This process is colloquially known as mechanical vapor recompression.

Figure 11:
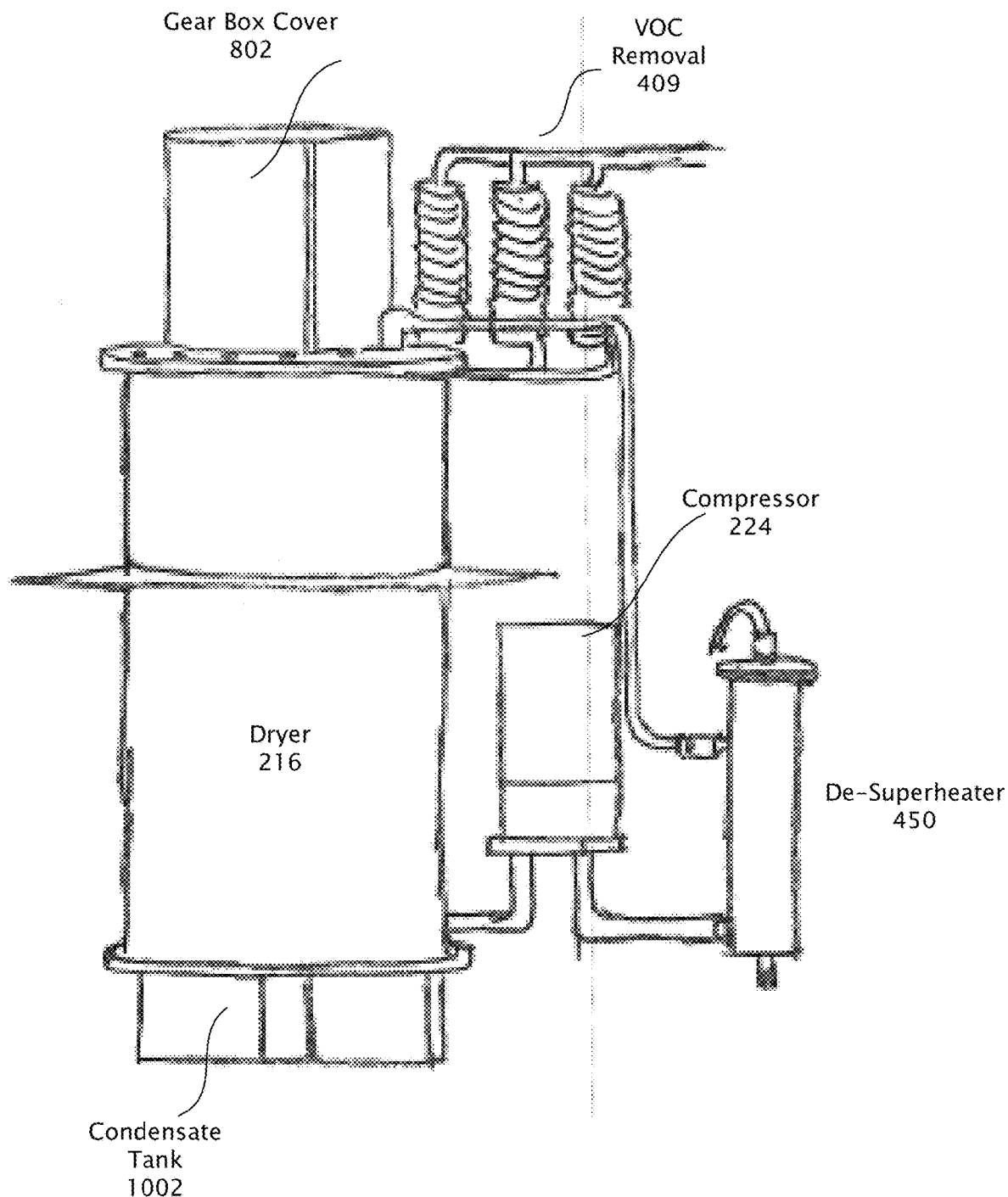
FIG. 11 is a pictorial diagram showing auxiliary components to dryer component.

FIG. 11 is a pictorial diagram showing auxiliary components to the dryer 216. As previously described, vapor generated inside the dryer from the wet waste is directed to a de-superheater 450 and compressor 224 before being directed back to the dryer 216. The dryer 216 also includes a VOC removal system 409 as previously described. Attached to the bottom of the dryer 216 is a condensate tank 1002 for collecting the condensed vapor 320 from the dryer 216 shell.

Figure 12:
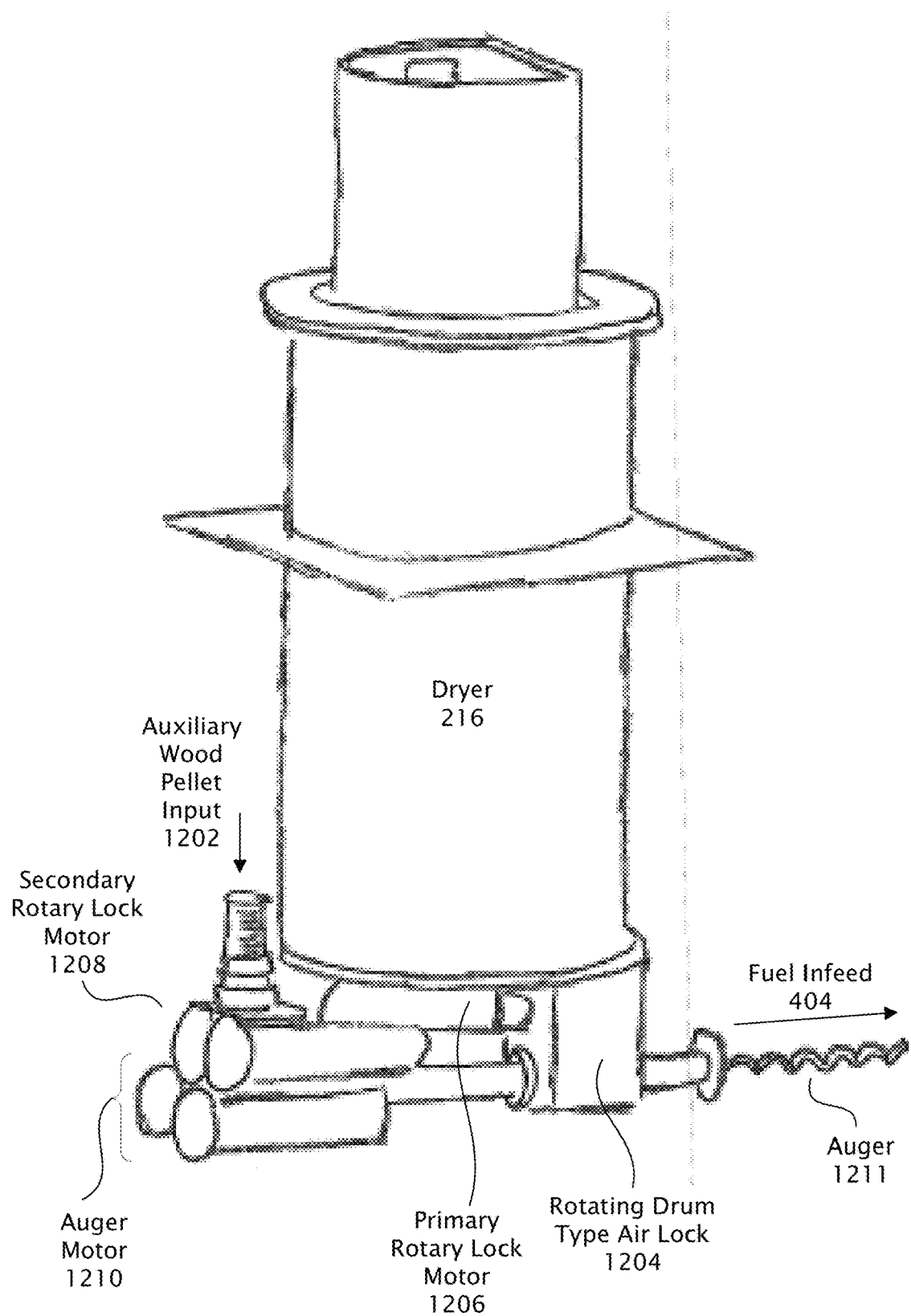
FIG. 12 is a pictorial diagram showing the dryer with air locked fire box and fuel feed mechanisms.

FIG. 12 is a pictorial diagram showing the dryer with an airlocked separation from the firebox 1204 and fuel feed mechanism. Also attached to the fuel feed mechanism is an auxiliary wood pellet input 1202 to provide supplemental fuel. Motors turn the rotating drum air lock 1204, including the primary rotary lock motor 1206 and the secondary rotary lock motor 1208. The auger 1211 may be turned by the auger motor 1210. Those skilled in the art will recognize that the airlock and fuel feed mechanism could be designed in many equivalent ways.

Figure 13:
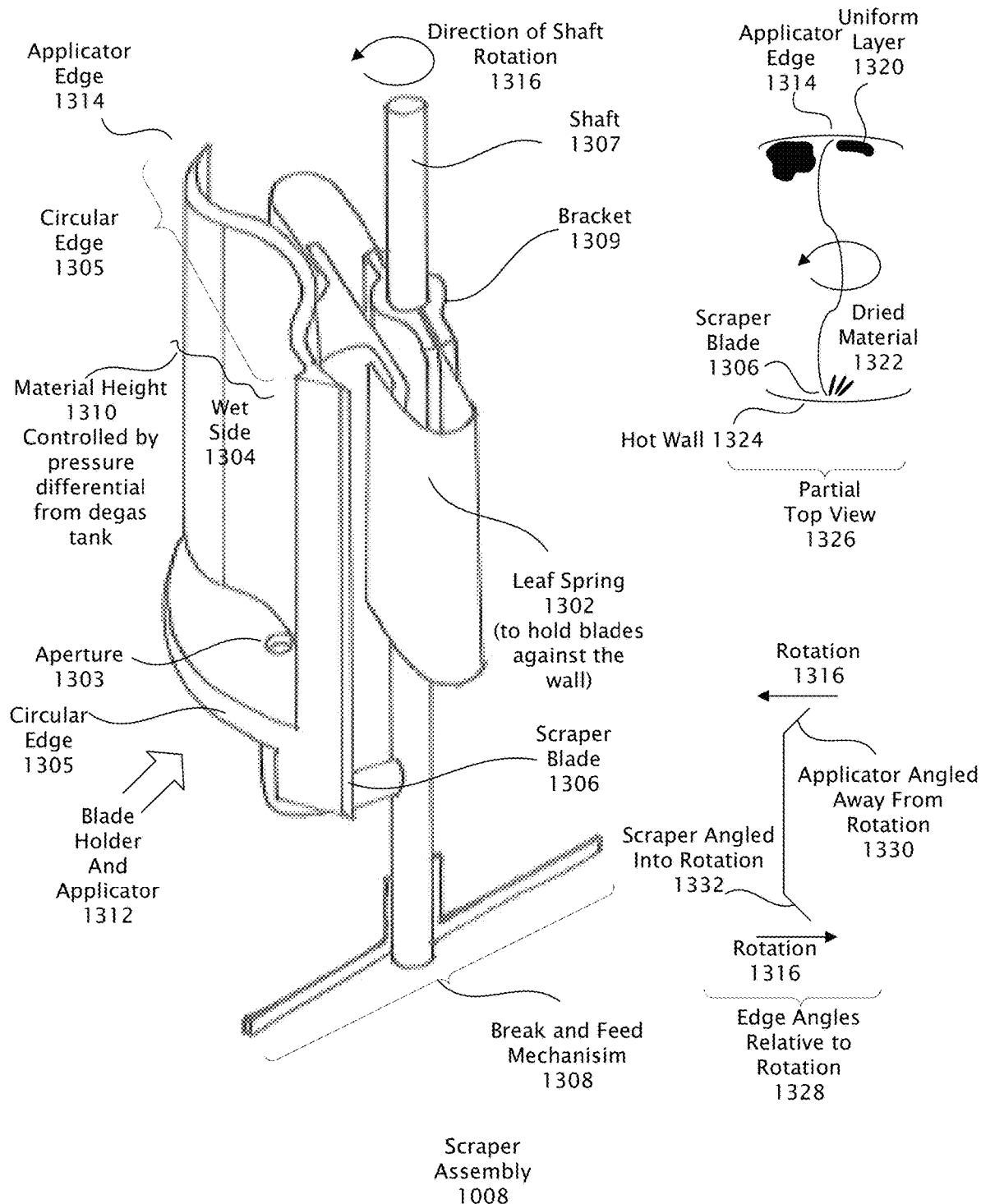
FIG. 13 is a pictorial diagram showing a first side of the scraper assembly internal to the dryer component.

FIG. 13 is a pictorial diagram showing a first side of one example of a combined scraper and applicator assembly 1008 internal to the dryer. In general, the combined scraper and applicator mechanism applies a thin film of waste to the dryer walls and the same mechanism then scrapes the dried film from the walls. The scraper assembly advantageously utilizes a combination applicator and scraper blade, coupled to a shaft that turns the blade 1306 within the dryer (not shown).

The wet side 1304 of the shown scraper and applicator assembly 1008 acts as a tank with one of the walls being the interior of the dryer. The tank is formed using leaf springs 1302 biased to hold the assembly against the dryer wall forming a reservoir. The material height in the scraper could be controlled using the pressure differential between the dryer and degas tank 1310. Fixed to one side of the scraper tank is a blade 1306 for removing material.

Scraper blade 1306 is generally "5" shaped 1311 when viewed from above, with vertical sides parallel to each other. The bottom of the blade includes an aperture 1303 to allow the flow of material into a cavity formed by the blade and dryer wall. The bottom of the blade includes a planar surface with a cylindrical outer edge 1305 that matches the curvature of the dryer wall. A blade 1306 may be removably attached to the scraper. On an opposite or dry side of the scraper a typically integral bracket is coupled to a pair if leaf springs 1302 that are generally "U" shaped and provide outward bias to push the vertical edges of the scraper blade against the wall of the dryer. The leaf springs 1302 couple at an opposing edge to a bracket 309 disposed on the shaft 1307. At the base of the shaft 1307 is disposed a break and feed mechanism 1308 which is typically implemented as rotating arms attached to the shaft.

In partial top view 1326 it can be seen that the applicator edge tends to spread a uniform layer of slurry 1320 on the hot wall 1324 due to the tilt of the applicator blade. This tends to aid in the uniform drying of the slurry. At the other end of the blade assembly the scraper blade 1306 tends to face into the direction of travel to scrape the dried material 1322 from the hot wall 1324. The angles of the scraper and applicator do not have to be the same. Also for a direction of rotation opposite to that shown the blades would be opposite in orientation to that shown.

In the further simplified top view edge angles relative to rotation 1328 are shown. As can be seen the applicator edge may be angled away from the direction of rotation 1330. The scraper may be angled into the direction of rotation 1332. For an opposite direction of rotation the angles would be the opposite to that shown. The angles of the scraper and applicator do not have to be the same. And lastly in an alternative example one or more of the angles may be 0 degrees-that is the blade or applicator may be perpendicular to the cylindrical dryer wall at its point of contact.

Figure 14:
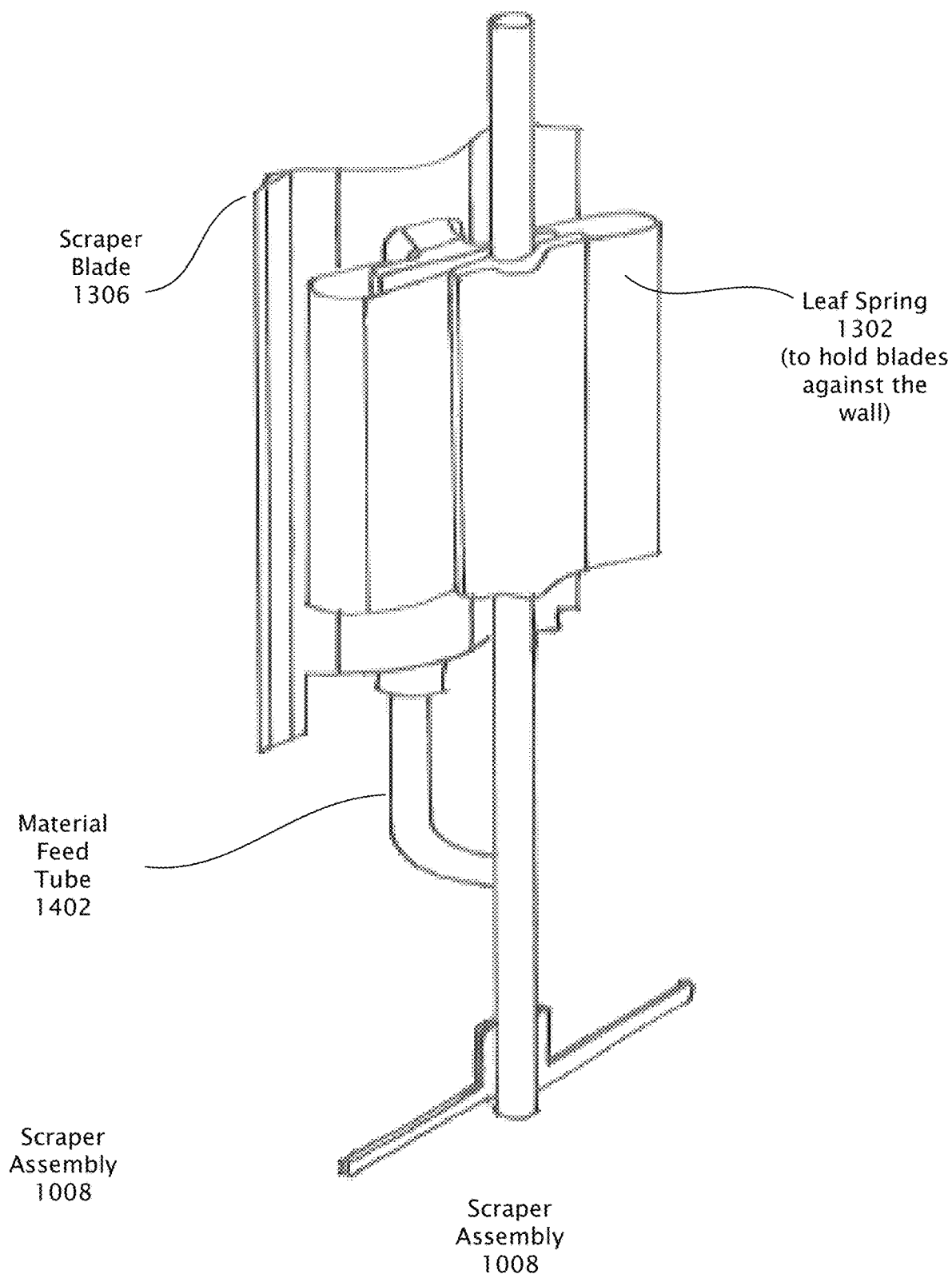
FIG. 14 is a pictorial diagram showing a second side of the scraper assembly internal to the dryer component.

FIG. 14 is a pictorial diagram showing an opposite (dry) side of one example scraper assembly internal to the dryer component. Wet material enters the scraper through a material infeed tube 1402. A scraper blade 1306 and leaf spring 1302 are used as previously described.

Figure 15:
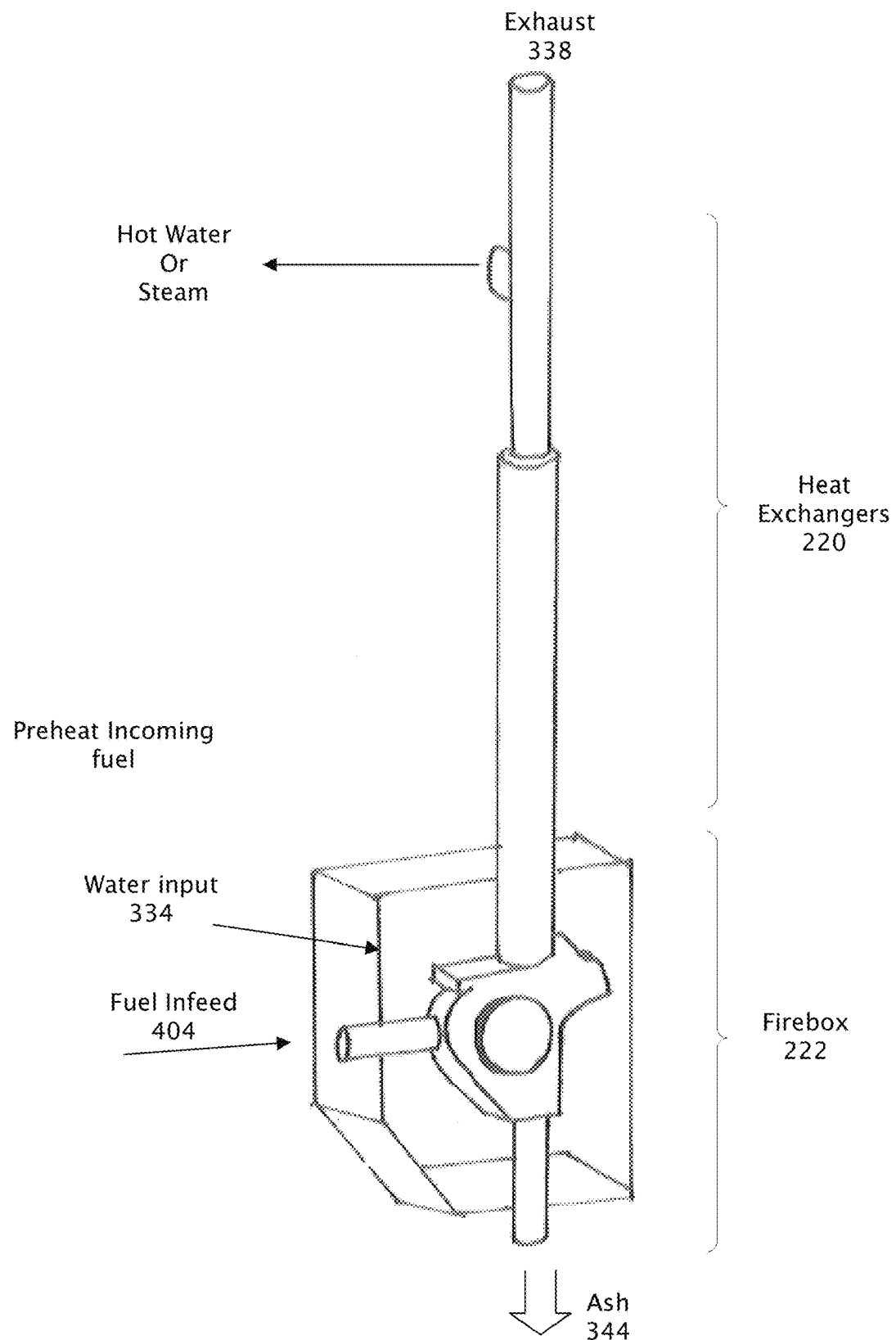
FIG. 15 is a pictorial diagram showing the firebox and chimney with multiple heat exchangers for air and water.

FIG. 15 is a pictorial diagram showing the firebox and chimney with multiple heat exchangers for air and water. Fuel enters the firebox through the fuel infeed 404, is burned, and exits through the ash outlet 344. Air and water are heated up in the heat exchangers 220 using the exhaust 338 of the firebox.

Figure 16:
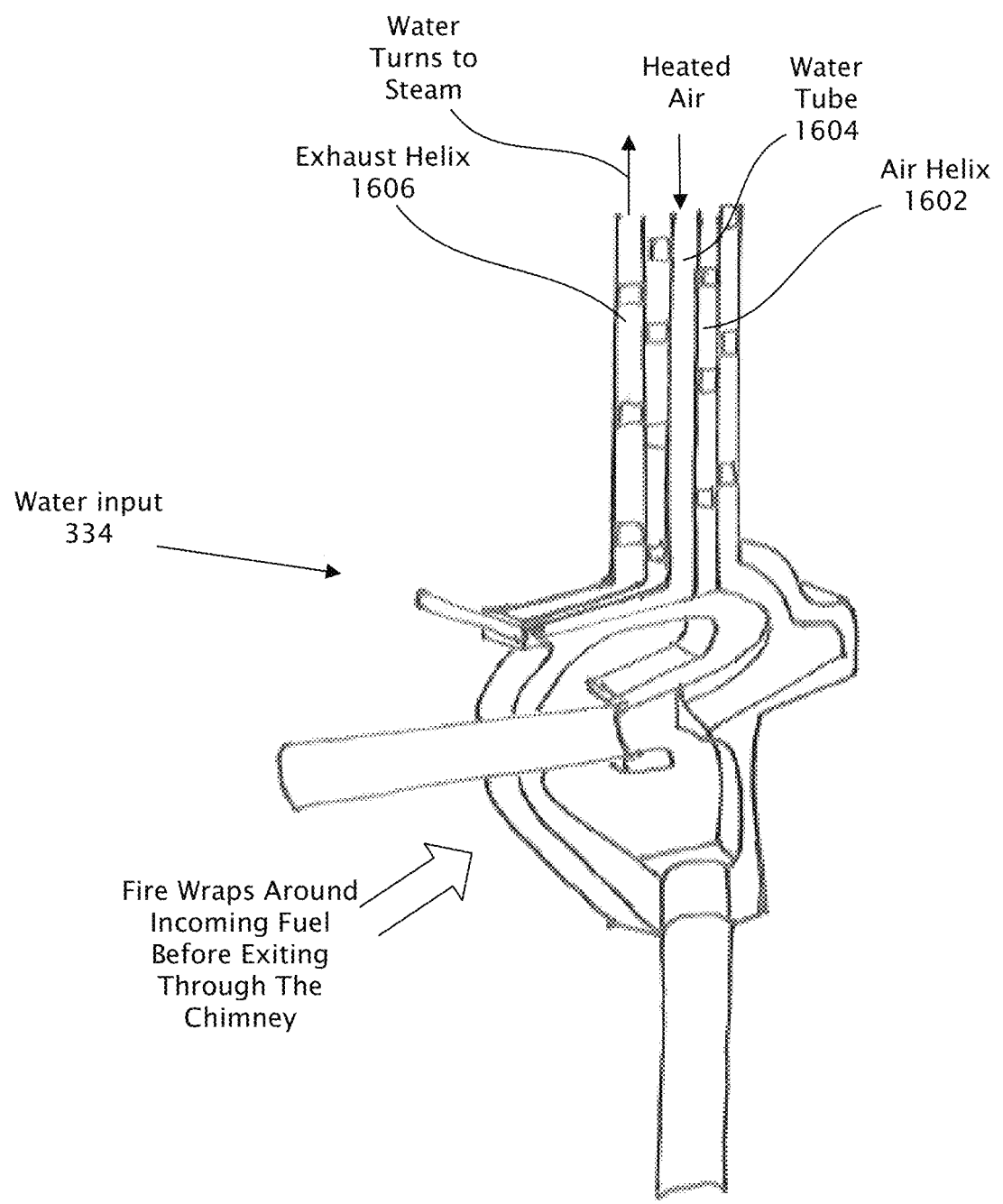
FIG. 16 is a pictorial diagram showing the interior of the firebox.

FIG. 16 is a pictorial diagram showing the interior of the firebox (222 of FIG. 2). Heated incoming air 1602 and combustion exhaust 1606 flow in helical paths. The water 334 flows in a central tube 1604 of the heat exchanger as previously described. Those skilled in the art will recognize that these heat exchangers could be implemented in many ways.

Figure 17:
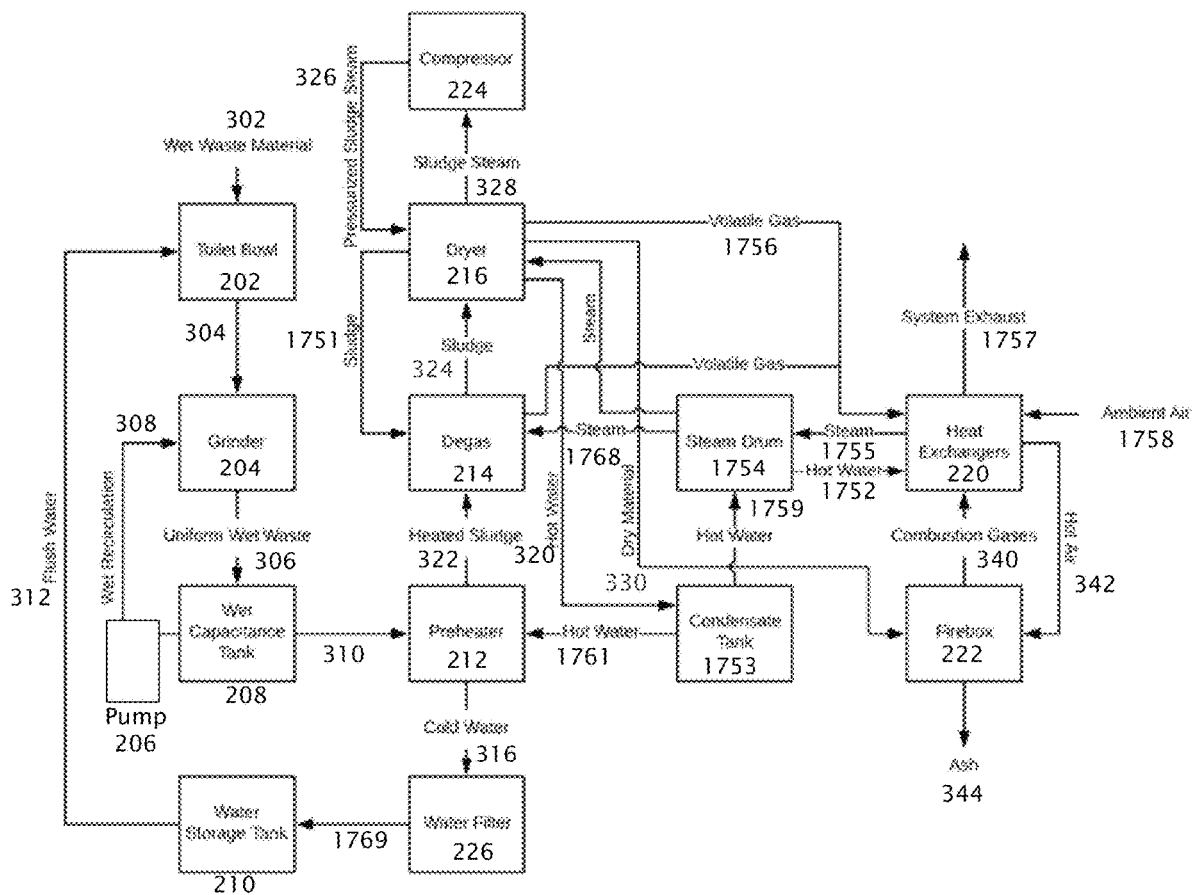
FIG. 17 is a system block diagram showing another possible configuration of the toilet for use in areas having limited public utility services.

FIG. 17 is another possible configuration of the waste processing toilet for use in areas with limited access to public utility services. This example is an alternative configuration of the example of FIG. 3 including additional components.

Wet waste 302 enters a toilet 202, where it is flushed into a grinder 204. The waste from the grinder is transferred to a wet storage tank 208, equipped with a sludge recirculation pump 206. A clean water tank 210 provides flush water for the toilet. The waste from the wet storage 201 enters a preheater 212 and is next degassed 214. As part of degassing 214 and drying 216 hot sludge 322 is recirculated 1751 through these two units.

Hot degassed sludge 324 may be applied onto a drying surface of a dryer 216, what does not stick may recirculate 1751 to the degas 214, the remaining waste is dried in a dryer 216. Those skilled in the art can appreciate that the application of sludge to the drying surface may be implemented in many ways.

The substantially dried waste 330 enters a firebox 222 where it is burned yielding ash 344, and heat utilized by heat exchangers 220. The operation of the device 200 makes use of water recirculation to create steam, and a water filter 226 to filter the water recovered in the process.

Water and steam recirculation is provided in that hot water 320 from the dryer is routed into the steam drum 1754, via a condensate tank 1753. In the steam drum 1754 the water 1752 is recirculated through the heat exchangers 220 where it is turned to steam 1755. This steam 1755 may be routed to the dryer 216 or the degas 214, via the steam drum 1754 to add supplemental heat to the drying process.

The function of all other components not mentioned are the same between the two examples provided in FIG. 3 and FIG. 17.

Figure 18:
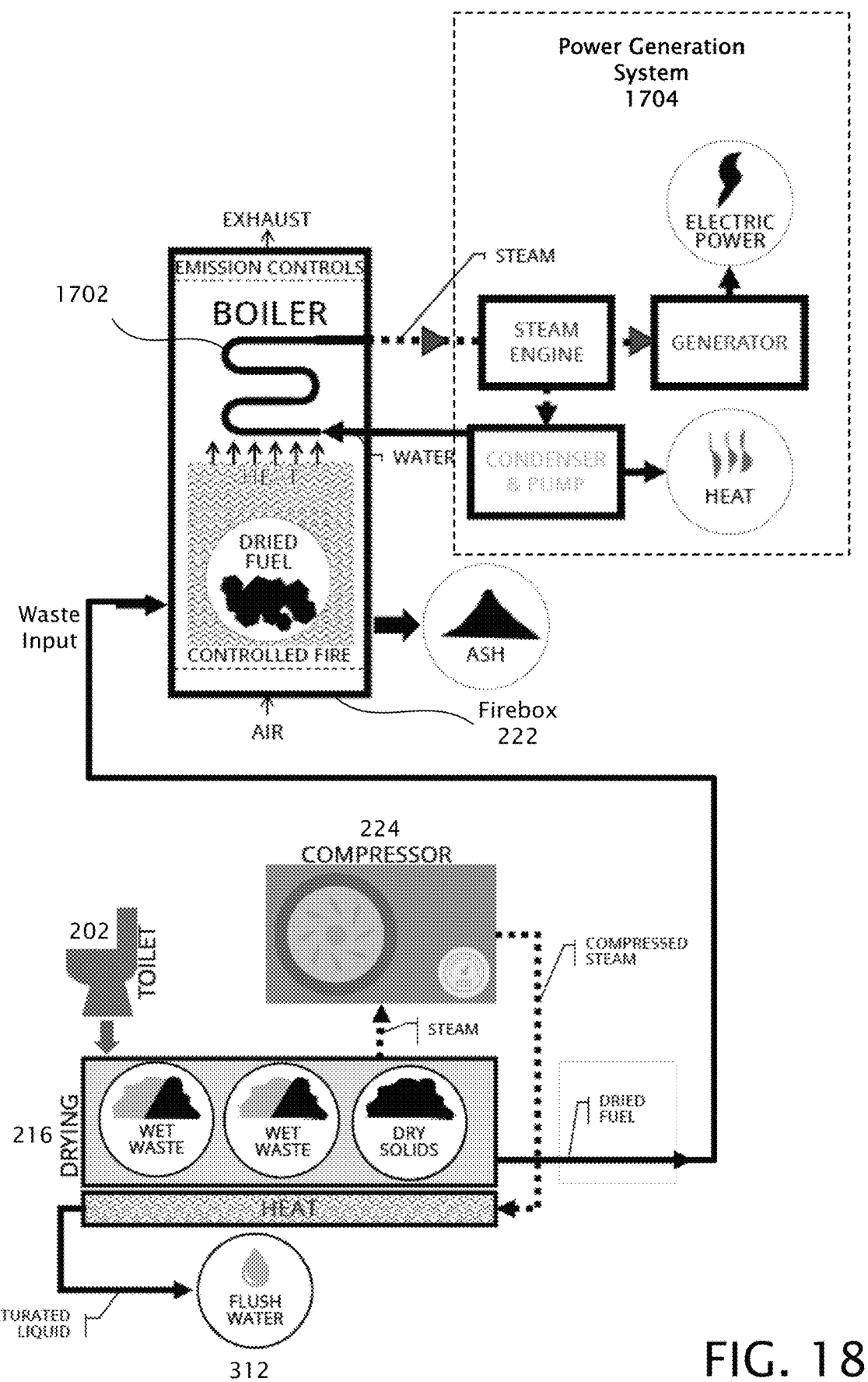
FIG. 18 is a pictorial diagram showing an example of the toilet for use in locations having limited utility services that includes power generation capabilities coupled to the firebox

FIG. 18 is a pictorial diagram showing an alternative example 400 of the toilet for use in locations having limited utility services. The toilet is as previously described however a boiler 1702 has been added to the firebox 222. The boiler 1702 is coupled to a power generation system 1802 that is capable of generating electricity and/or heat.

Figure 19:
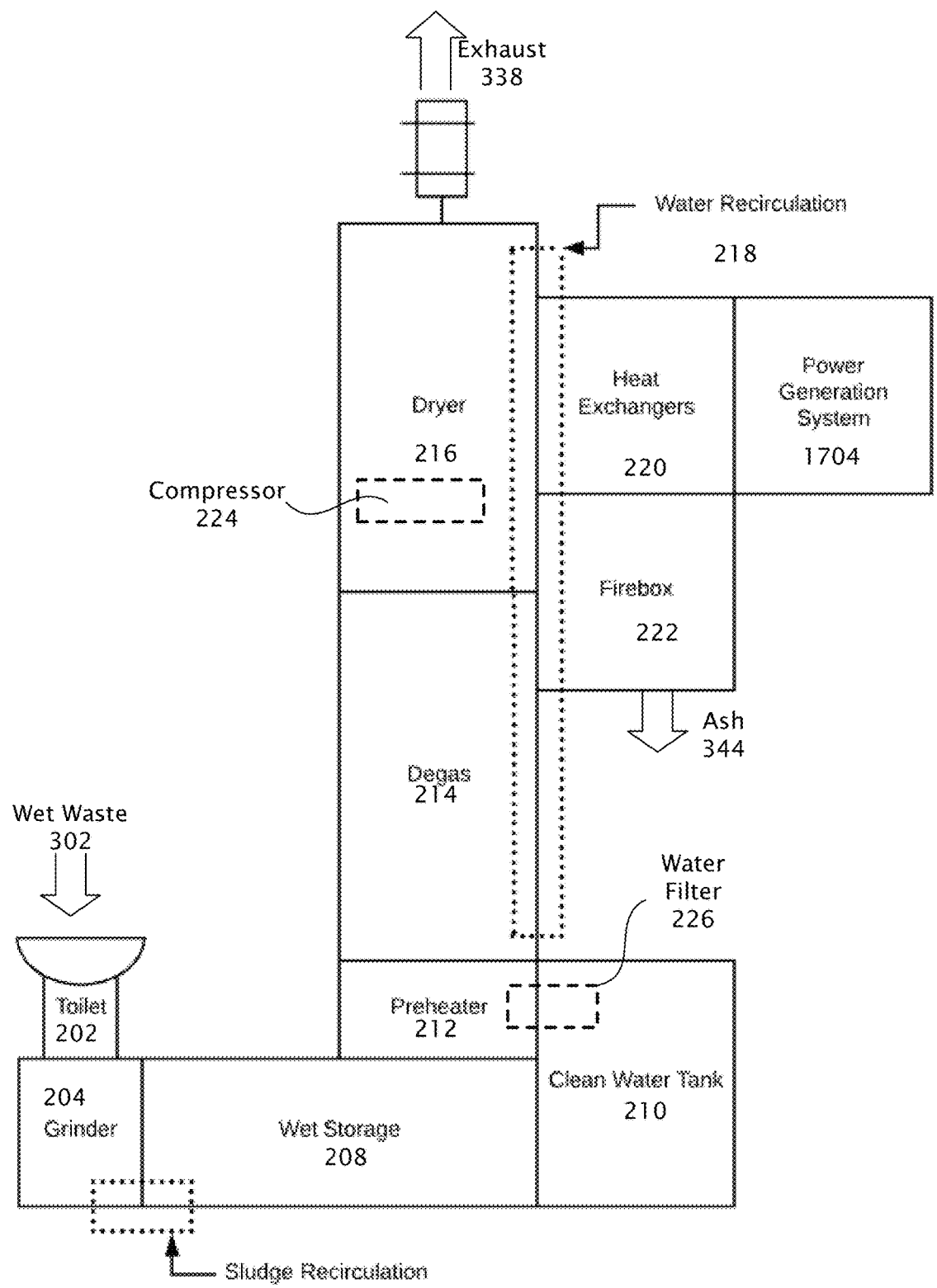
FIG. 19 is a pictorial diagram showing a second example of the toilet for use in locations having limited utility services that includes power generation capabilities.

FIG. 19 is a pictorial diagram showing the toilet for use in locations having limited utility services that includes a second example of the power generation capabilities. The unit 400 includes components as previously described with the addition of a power generation system 1802 which may be conventionally constructed to generate electricity and heat-typically by using a boiler (1702 of FIG. 18) to capture heat in the firebox 222.

Figure 20:
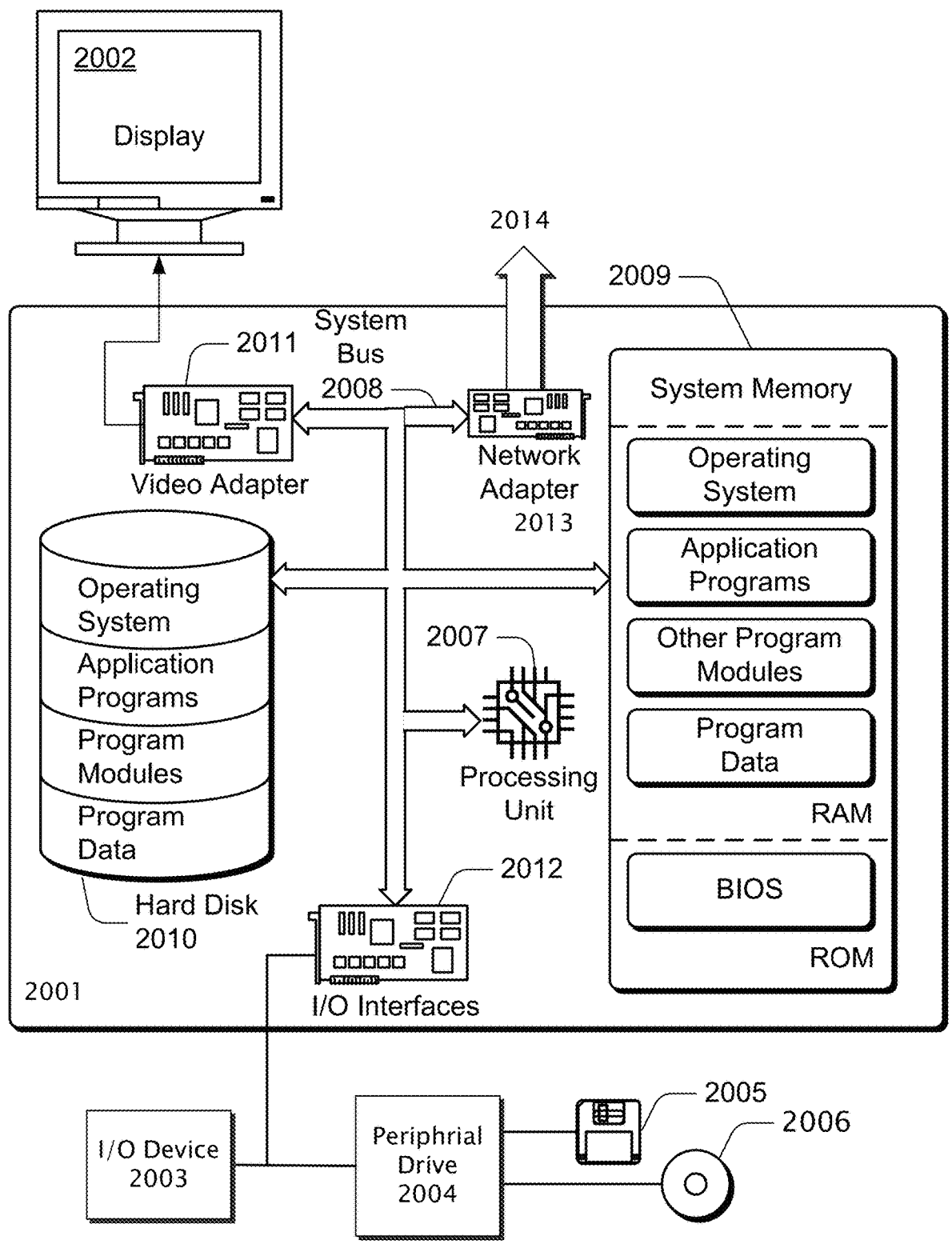
FIG. 20 illustrates an exemplary computing environment 3500 in which the control of the waste processing toilet for use in locations having limited utility services described in this application, may be implemented.

FIG. 20 illustrates an exemplary computing environment 3500 in which the control of the waste processing toilet for use in locations having limited utility services described in this application, may be implemented. Exemplary computing environment 2000 is only one example of a computing system and is not intended to limit the examples described in this application to this particular computing environment.

For example, the computing environment 2000 can be implemented with numerous other general purpose or special purpose computing system configurations. Examples of well known computing systems, may include, but are not limited to, personal computers, hand-held or laptop devices, microprocessor-based systems, PLC controllers, PIC controllers, multiprocessor systems, tablets, cellular telephones, and the like.

The computer 2000 includes a general-purpose computing system in the form of a computing device 2001. The components of computing device 2001 can include one or more processors (including CPUs, GPUs, microprocessors and the like) 2007, a system memory 2009, and a system bus 2008 that couples the various system components. Processor 2007 processes various computer executable instructions, including those to control the operation of the multi-functional slurry processing system, to control the operation of computing device 2001 and to communicate with other electronic and computing devices (not shown). The system bus 2008 represents any number of several types of bus structures, including a memory bus or memory controller, a peripheral bus, an accelerated graphics port, and a processor or local bus using any of a variety of bus architectures.

The system memory 2009 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 2007.

Mass storage devices 2004 may be coupled to the computing device 2001 or incorporated into the computing device by coupling to the buss. Such mass storage devices 2004 may include a magnetic disk drive which reads from and writes to a removable, non-volatile magnetic disk (e.g., a "floppy disk") 2005, or an optical disk drive that reads from and/or writes to a removable, non-volatile optical disk such as a CD ROM or the like 2006. Computer readable media 2005, 2006 typically embody computer readable instructions, data structures, program modules and the like supplied on floppy disks, CDs, portable memory sticks and the like.

Any number of program modules can be stored on the hard disk 2010, Mass storage device 2004, ROM and/or RAM 2009, including by way of example, an operating system, one or more application programs, other program modules, and program data. Each of such operating system, application programs, other program modules and program data (or some combination thereof) may include an embodiment of the systems and methods described herein.

A display device 2002 can be connected to the system bus 2008 via an interface, such as a video adapter 2011. A user can interface with computing device 702 via any number of different input devices 2003 such as a keyboard, pointing device, track-pad, mouse, serial port, and/or the like. These and other input devices are connected to the processors 2007 via input/output interfaces 2012 that are coupled to the system bus 2008, but may be connected by other interface and bus structures, such as a parallel port, game port, and/or a universal serial bus (USB).

Computing device 2000 can operate in a networked environment using connections to one or more remote computers through one or more local area networks (LANs), wide area networks (WANs) and the like. The computing device 2001 is connected to a network 2014 via a network adapter 2013, a wireless interface, or alternatively by a modem, DSL, ISDN interface or the like.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

In alternative examples those skilled in the art will realize that control of the waste processing toilet for use in locations having limited utility services may be achieved with fewer components, hardwired logic, manual control (or a combination of automatic and manual control) distributed microprocessor controllers, or the like.

Figure 21:
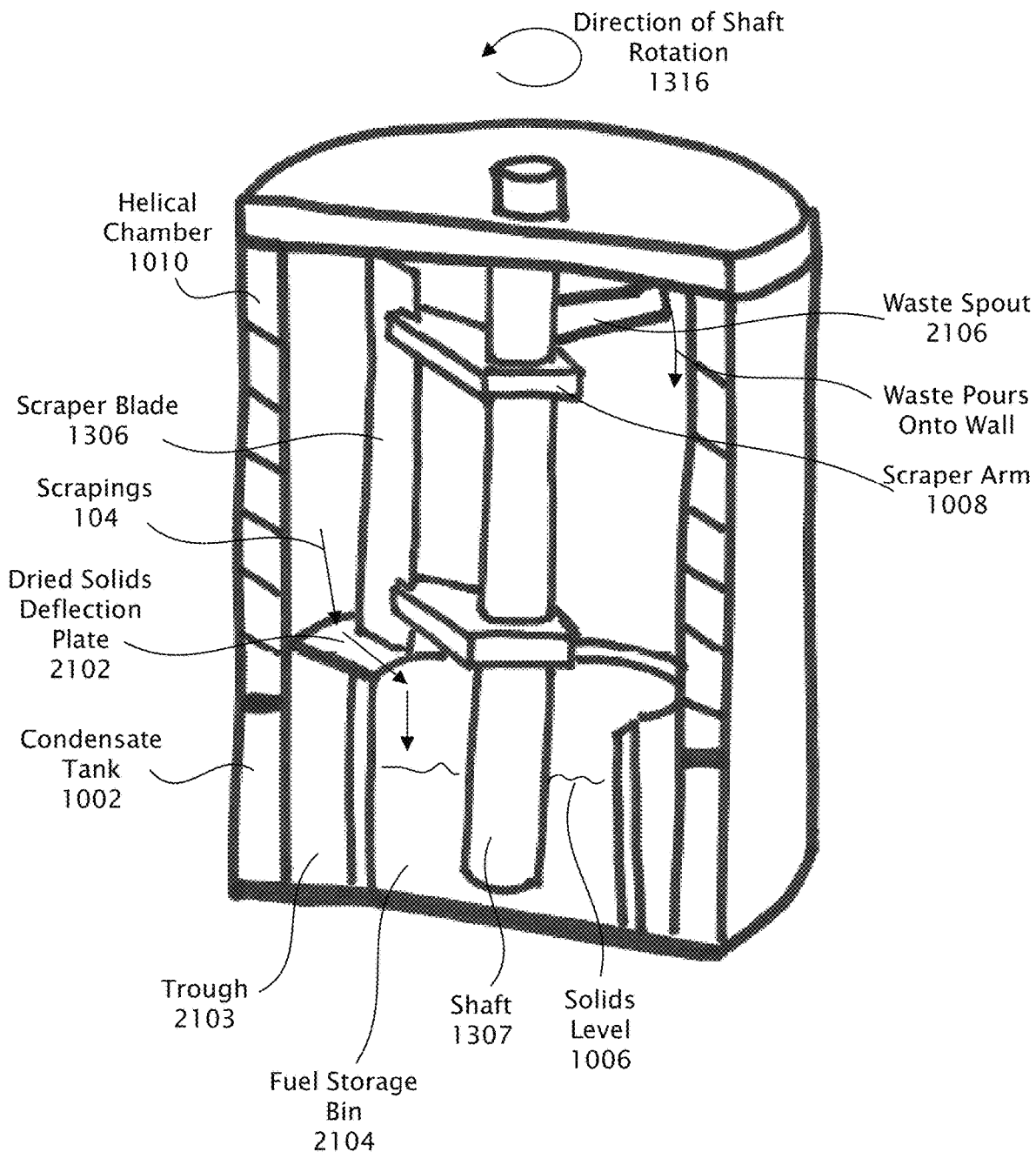
FIG. 21 is a pictorial diagram showing the combined dryer and fuel storage bin that would be used as a part of the system shown in FIG. 17.

FIG. 21 is a pictorial diagram showing the combined dryer and fuel storage bin that would be used as a part of the system shown in FIG. 17. Shown is a second example of the combined scraper and applicator mechanism 1008 that can be used to apply degassed waste 324 to the interior of the dryer 216 as the shaft 1307 turns. The assembly 1008 contains a waste spout 2101 that is positioned close to the interior wall of the dryer. The end of the spout 2101 is positioned such that waste emanating from the spout does not spray or clog. The spout 2101 pours an excess amount of degassed waste on the interior walls of the dryer 216. Waste that does not stick to the walls is collected in a trough 2103 located beneath the combined scraper and applicator mechanism 1008. The waste collected in the trough 2103 recirculates to the degas unit as previously described.

The combined scraper and applicator mechanism also contains a scraper blade 1306 which leads the waste spout 2101 and removes dried solids from the interior of the dryer in the form of scrapings 1004 that are stored to a certain level 1006 in the dryer 216. By leading the waste spout 2101, the scraper blade 1306 creates a clean surface for optimal drying of the applied degassed waste 324. Attached to the bottom of the scraper blade 1306 is a dried solids deflection plate 2102. The deflection plate remains with the scraper blade 1306 as the shaft 1307 in the dryer rotates 1316. The deflection plate covers the trough 2103 such that dry material scrapings 1004 are deflected into the fuel storage bin 2104 and do not fall into the trough 2103. Those skilled in the art will recognize that this scraper and applicator combination could be designed in many ways.

The solid and liquid fractions of the waste are separated in this dryer (216 of FIG. 2) as previously described using mechanical vapor recompression.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A system for processing a household's human waste comprising:
    a receptacle configured to receive human waste;
    a grinder coupled to the receptacle to homogenize the human waste into a wet slurry;
    a preheater including a preheater cold side configured to receive the wet slurry and a preheater hot side configured to receive a hot condensate wherein heat from the preheater hot side passes to the preheater cold side, producing a hot wet slurry output and a cold condensate output;
    a degas unit coupled to the preheater and receiving the hot wet slurry;
    a dryer including a dryer cold side configured to receive a degassed wet slurry from the degas unit and output a slurry vapor and a dried solids, and a dryer hot side configured to receive a pressurized slurry vapor and output a saturated condensate;
    a compressor configured to receive the slurry vapor and output the pressurized slurry vapor; and
    a water storage tank configured to receive the cold condensate.

2. The system for the processing a household's human waste of claim 1, in which the dryer pasteurizes the wet slurry to output a sterile effluent.

3. The system for the processing a household's human waste of claim 1, the system further comprising a combustion chamber configured to receive the dried solids from the dryer to produce hot combustion gases and ash as outputs.

4. The system for the processing a household's human waste of claim 3, the system further comprising: an energy conversion system configured to receive the hot combustion gases from the combustion chamber and outputs electrical power.

5. A method of processing human waste comprising:
    collecting and grinding waste within a grinding apparatus to produce a homogenous wet slurry output;
    preheating the homogeneous wet slurry using a previously processed hot condensate to produce a cooled condensate output and a heated wet slurry output;
    degassing the heated wet slurry to remove dissolved gasses;
    evaporating the heated wet slurry output to separate the slurry into a dried solids output and a slurry vapor output;
    compressing the slurry vapor to produce a pressurized slurry vapor; and
    heating using the slurry vapor as a heat source for evaporating the heated wet slurry.

6. The method of processing human waste of claim 5 further comprising combusting the dried solids output to produce a hot combustion gas output and an ash output.

7. The method of processing human waste of claim 6 further comprising converting the energy in the hot combustion gas output into electrical power.

* * * * *